UNITED STATES PATENT OFFICE.

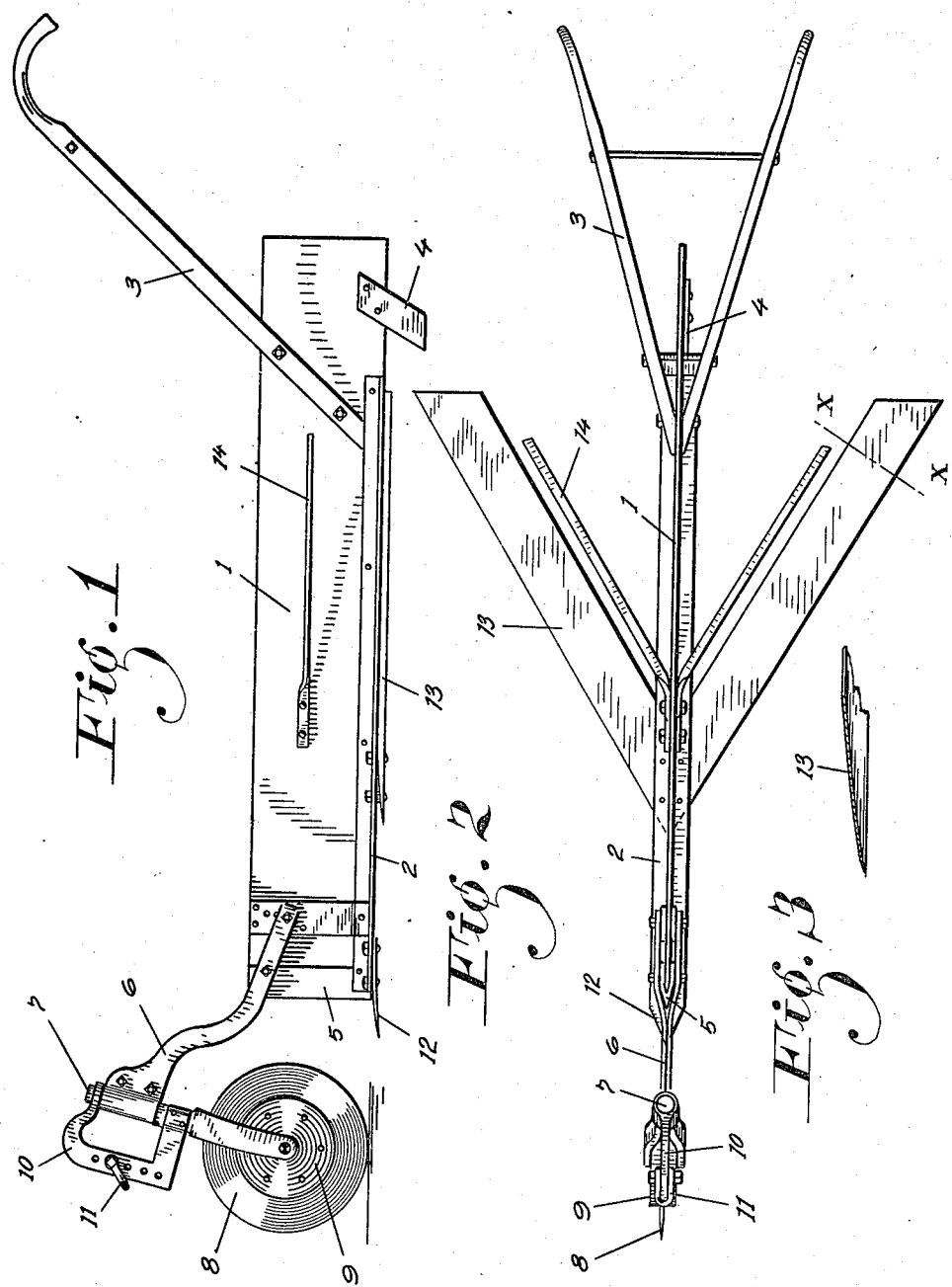

JOHN J. PIMM, OF LODI, CALIFORNIA.

BEAN-CUTTER.

1,279,429.

Specification of Letters Patent.   Patented Sept. 17, 1918.

Application filed April 1, 1918.   Serial No. 225,861.

*To all whom it may concern:*

Be it known that I, JOHN J. PIMM, a citizen of the United States, residing at Lodi, in the county of San Joaquin, State of California, have invented certain new and useful Improvements in Bean-Cutters; and I do declare the following to be a clear, full, and exact description of the same, reference being had to the accompanying drawings, and to the characters of reference marked thereon, which form a part of this application.

This invention relates to improvements in devices for cutting beans and forming them into windrows. It is a well known fact that bean vines grow profusely and the vines from different rows grow over and intertwine with those of adjacent rows and it is necessary, when cutting the vines and forming them into windrows, to separate these intertwining vines. This may be done by pulling them apart or by cutting them. The aim of my invention is to provide a simple cutter for cutting them which may be used in soft or hard dirt whether the same is perfectly level or not.

I further aim to provide a simple draft means for the cutter together with attached handles for holding and guiding the same.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of the complete device.

Fig. 2 is a top plan view of the same.

Fig. 3 is a sectional view taken on a line X—X of Fig. 2.

Referring now more particularly to the characters of reference on the drawings, the numeral 1 designates a beam set edgewise and provided at its lower edge with projecting flanges 2 to form a bearing base. At the rear of said beam 1 are supporting handles 3 and also a downwardly projecting tongue 4 which is designed to move through the ground and normally tend to maintain the beam in its vertical position. At the forward end of the beam 1 is a dividing nose plate 5 and projecting upwardly from the top edge of said beam at its forward end is a supporting arm 6. Turnable in the outer edge of this supporting arm 6 is the spindle 7 of a cutter wheel 8 adapted to ride along the ground in front of the beam 1 and cut the intertwining vines. This cutter wheel 8 is provided with a pair of wide side rollers 9 which support the cutter on the ground and prevent its cutting too deep into the same irrespective of the kind of soil over which the cutter may operate. A draft bar 10 is connected with the pin 7 and provided with a clevis 11 whereby the horse or other draft power may be connected with the member 10.

A collecting finger 12 projects forwardly from the base of the nose plate 5. At a spaced distance back from the nose plate 5 are laterally projecting cutters 13 which slope slightly from their inner to their outer edges so as to aid the cutters working themselves into the ground. Above the cutters 13 are laterally extending fender bars 14.

In practice, the device is drawn forward with any suitable power. It is supported in the rear by the operator through the medium of the handles 3. The tongue 4 cuts into the ground and helps to maintain the vertical stability of the beam 1. As the device moves forwardly, the cutter 8 cuts the intertwining vines between the rows. The finger member 12 moves under the vines and lifts them from the ground in contact with the nose plate 5. The nose plate separates them into two parts, which separation is maintained by the beam 1. The vines pile up along the side of the beam and are finally deflected into windrows by means of the fender bars 14. By the time the vines reach the cutters 13, they are pretty well lifted from the ground and this permits the cutters to move freely underneath them and engage the roots and cut the same. The entire mass of vines is then formed into windrows by means of the fender bars 14.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention, what I claim as new and useful and desire to secure by Letters Patent is:—

1. A bean cutter comprising a beam set vertically edgewise, supporting handles at the rear of the beam, laterally extending cutters on the beam, a cutter wheel rotatably mounted in a spindle, a supporting arm extending forwardly of the beam in which the spindle is swivelly mounted, and lugs on the spindle whereby a draft animal may be attached to pull the cutter and steer the same.

2. A bean cutter comprising a beam set vertically edgewise, a cutter wheel swivelly mounted for rotation forward of the beam and centrally thereof, a V shaped division plate vertically mounted to the head of the beam in a line with the cutter wheel, a finger member projecting forwardly from the front end of the beam under the division plate, and laterally extending cutters on the beam at a spaced distance from the division plate.

3. A bean cutter comprising a beam set vertically edgewise, a cutter wheel mounted for rotation at the head of the beam, a finger member projecting forwardly from the front end of the beam at the lower edge thereof and sloping to a point slightly below the lower edge of such beam, means for supporting the beam at the rear end, laterally extending cutters on the beam at a spaced distance from the forward end thereof, and laterally extending fender bars on the beam above the cutters.

In testimony whereof I affix my signature in presence of two witnesses.

JOHN J. PIMM.

Witnesses:
VERADINE WARNER,
BERNARD PRIVAT.

Copies of this patent may be obtained for five cents each, by addressing the "Commissioner of Patents, Washington, D. C."